Patented June 24, 1930

1,766,813

UNITED STATES PATENT OFFICE

HEINZ EICHWEDE AND ERICH FISCHER, OF HOCHST-ON-THE-MAIN, GERMANY, ASSIGNORS TO GENERAL ANILINE WORKS, INC., OF NEW YORK, N. Y., A CORPORATION OF DELAWARE

SULFOARYLPYRAZOLONECARBOXYLIC ACID ESTERS AND PROCESS OF MAKING SAME

No Drawing. Application filed November 8, 1927, Serial No. 231,989, and in Germany November 27, 1924.

The present application relates to a process of preparing sulfoarylpyrazolone-carboxylic acid esters and is a continuation-in-part of our U. S. application Ser. No. 68,025 filed November 9, 1925.

We have found that sulfoarylpyrazolone-3-carboxylic acid esters are obtained in a quite general way by heating in an aqueous solution, in the presence of an alkaline earth carbonate or a substance of similar action for instance, magnesia, the hydrazones obtained from the corresponding X-hydrazinesulfonic acids (X standing for an aromatic nucleus, its homologues or substitution products) and oxalacetic ester, whereby the formation of the pyrazolone by the closure of the ring is effected without there being any saponification of the carboxylic ester group.

If calcium carbonate is used for closing the ring exactly one equivalent of calcium carbonate is consumed there being constantly a neutral reaction; the products resulting from the reaction which may for instance be of the following composition

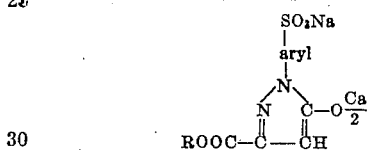

are preferably treated in the cold with sodium carbonate and the chalk is filtered off. Most of the sulfoarylpyrazolone-carboxylic acid ester are readily soluble in water so much so that a separation is practically impossible; however the liquors they give are so pure that they can be directly used for the coupling process.

Particularly when used as coupling components in the preparation of azo-dyes the sulfoarylpyrazolone-carboxylic acid esters possess valuable properties.

The process for preparing the sulfophenyl-pyrazolone-carboxylic acid ester may be carried out according to the following example to which our invention is, however, not limited, the parts being parts by weight.

188 parts of o-sulfophenylhydrazine are suspended in about 400 parts of water. There are then added, while stirring, at ordinary temperature 220 parts of the sodium salt of oxalacetic ethyl ester and the mixture is stirred for about ½ hour at ordinary temperature; the mass is then slowly heated to 60° C. and when the formation of the hydrazone is complete, about 300 grams of calciumcarbonate are added and the whole is then heated to boiling for about 15 hours. After cooling, the resulting calcium salt is acted upon with a solution of sodium carbonate and the calciumcarbonate is filtered off. The liquor so obtained can be directly used for being coupled with a diazo-compound. The 1-(2'-sulfophenyl)-5-pyrazolone-3-carboxylic acid ethyl ester can be isolated in small quantities by means of potassium chloride. The potassium salt of the 1-(2'-sulfophenyl)-5-pyrazolone-3-carboxylic acid ethyl ester of the following formula:

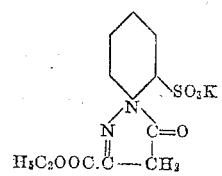

forms a colorless powder which dissolves extremely readily in water.

In the same manner as indicated in the foregoing example, the hydrazones obtainable for instance from 2-chlor-5-sulfophenylhydrazine, 3-sulfo-phenyl-hydrazine, 2-5-dichlor-4-sulfophenylhydrazine, 2-methyl-3-5-disulfophenylhydrazine or the like, and oxalacetic ester may be converted into the corresponding sulfoarylpyrazolone carboxylic acid esters.

The 1-(4'-chlor-2'-sulfophenyl)-5-pyrazolone-3-carboxylic ethylester may, for instance, also be obtained by heating the hydrazone from 4-chlor-2-sulfophenylhydrazin and oxalacetic ethylester in an aqueous solution in the presence of magnesia.

As regards the preparation of the esters, we would add that, when industrially making them, it is not necessary to isolate the sodium salt of the oxalacetic acid, but it suffices to introduce the hydrazine paste, while stirring, into the solution of the sodium salt of oxalacetic ester in benzene obtained during the manufacturing process; in this case the benzene is subsequently distilled off and the dyestuff worked up as indicated in the foregoing example.

We claim:

1. The process for preparing sulfoaryl-pyrazolone-carboxylic acid esters of the general formula:

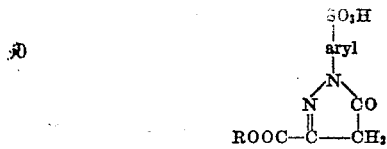

wherein aryl means a benzene nucleus, substituted in any way or non-substituted and wherein R stands for an alkyl residue which process comprises condensing an arylhydrazinesulfonic acid with an oxalacetic ester to produce the corresponding hydrazone and converting the latter by heating it with an alkaline earth carbonate into the pyrazolone.

2. The process for preparing sulfoaryl-pyrazolone-carboxylic acid esters of the general formula:

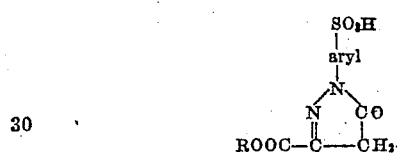

wherein aryl means a benzene nucleus, substituted in any way or non-substituted and wherein R stands for an alkyl residue which process comprises condensing an arylhydrazinesulfonic acid with an oxalacetic ester to produce the corresponding hydrazone and converting the latter by heating it with calcium carbonate into the pyrazolone.

3. As new products, the compounds of the following formula:

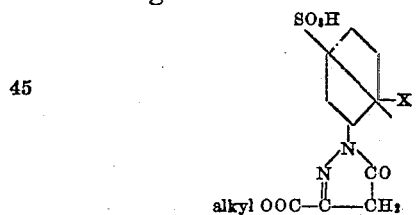

wherein X stands for the residue —$CH_3$ or for halogen,—forming colorless powders which are readily soluble in water and split off alcohol when heated with a caustic soda solution.

4. As new products, the compounds of the following formula:

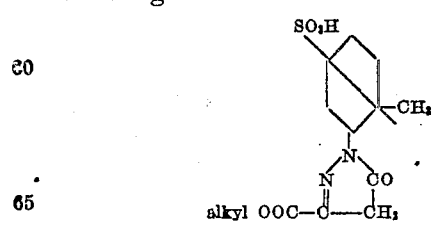

forming colorless powders which are readily soluble in water and split off alcohol when heated with a caustic soda solution.

5. As new products, the compounds of the following formula:

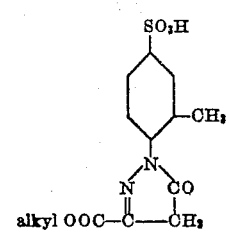

forming colorless powders which are readily soluble in water and split off alcohol when heated with a caustic soda solution.

6. As a new product, the compound of the following formula:

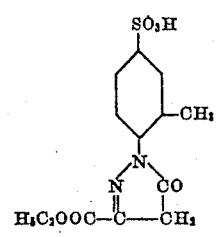

forming a colorless powder which is readily soluble in water and splits off alcohol when heated with a caustic soda solution.

In testimony whereof, we affix our signatures.

HEINZ EICHWEDE.
ERICH FISCHER.